United States Patent [19]

Soyland

[11] 4,049,138

[45] Sept. 20, 1977

[54] EXCAVATOR HAVING ADJUSTABLE WHEELS

[76] Inventor: Ingebret Soyland, Solhogda 2 Brynehaugen, Bryne, Norway, N-4340

[21] Appl. No.: 597,227

[22] Filed: July 18, 1975

[30] Foreign Application Priority Data

July 19, 1974 Norway ............................... 7422642

[51] Int. Cl.[2] ......................... B62D 61/00; E02F 9/02

[52] U.S. Cl. ....................................... 214/132; 37/103; 37/DIG. 6; 212/38; 212/49; 214/138 R; 214/142; 280/80 B

[58] Field of Search ................. 37/1, 103; 212/28, 38, 212/48, 49, 145; 214/138, 131 R, 132, 138 R; 280/638, 42, 765, 656, 80 R, 80 B, 62, 762; 180/9.48

[56] References Cited

U.S. PATENT DOCUMENTS

| | | | |
|---|---|---|---|
| 1,914,692 | 6/1933 | Kakaska | 212/145 |
| 2,431,388 | 11/1947 | Fitzpatrick | 280/80 R |
| 2,664,685 | 1/1954 | Phelps | 280/638 X |
| 3,139,288 | 6/1964 | Peterson | 280/656 |
| 3,625,381 | 12/1971 | Menzi | 214/138 |
| 3,642,300 | 2/1972 | Klopp | 280/656 |
| 3,700,115 | 10/1972 | Johnson et al. | 212/38 |
| 3,899,037 | 8/1975 | Yuker | 280/638 X |

FOREIGN PATENT DOCUMENTS

| | | | |
|---|---|---|---|
| 532,195 | 1/1958 | Belgium | 280/42 |
| 1,258,054 | 1/1968 | Germany | 212/145 |
| 609,709 | 9/1960 | Italy | 280/765 |
| 804,378 | 11/1958 | United Kingdom | 212/38 |

*Primary Examiner*—Edgar S. Burr

*Assistant Examiner*—Steven A. Bratlie

*Attorney, Agent, or Firm*—John J. Dennemeyer

[57] ABSTRACT

An excavator has its wheels pivotably mounted on brackets which are adjustably secured to the periphery of the under-frame so that the gauge of the wheel track and their distance to each other can be changed.

2 Claims, 2 Drawing Figures

EXCAVATOR HAVING ADJUSTABLE WHEELS

The present invention relates to an excavator of the kind where the under frame is formed like a big, preferably cylindrical vessel with a plane bottom in order to prevent the excavator from sinking deeply into soft ground.

When excavators are moved from one working place to another this is usually done on the public road network. Some excavators are moved by their own motor, while others are trailed by truck. The allowed gauge of track for the wheels of an excavator is limited by the regulations of the road authorities, which implies the disadvantage that the gauge of track is often not sufficient.

The object of the invention is to provide an excavator of the kind mentioned above where the above mentioned disadvantage is eliminated.

According to the invention the object is attained in that the wheels of the excavator are pivotally mounted to brackets which are adjustably secured to the periphery of the under frame, so that gauge of track and distance of wheels can be changed.

A preferred embodiment of the invention will now be described by way of example with reference to the accompanying drawings in which.

Figure 1:
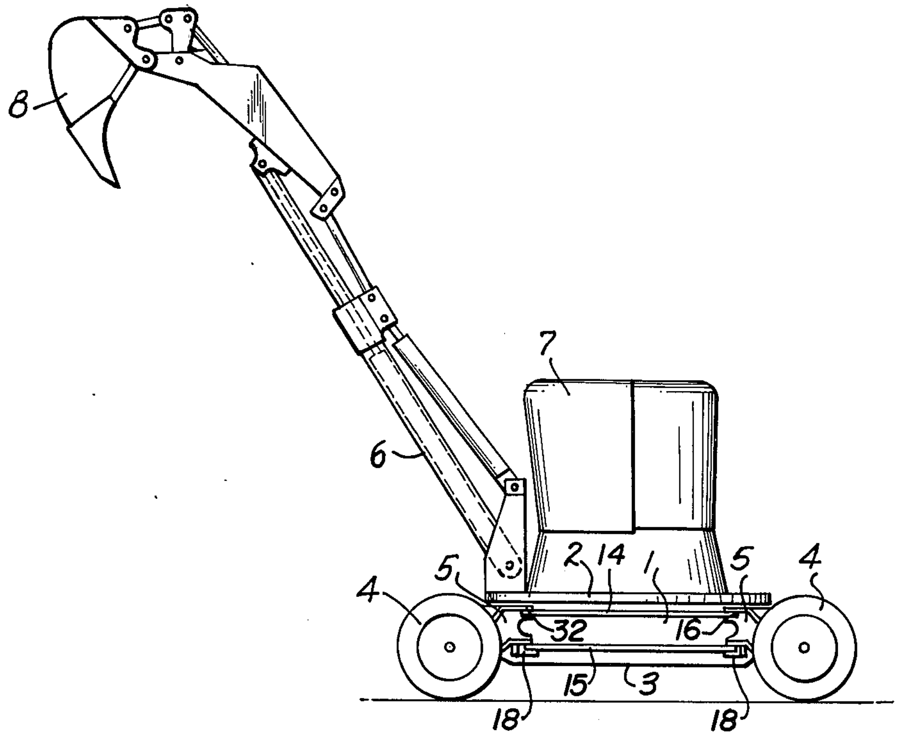
FIG. 1 is a side view of an excavator according to the invention.

Referring now to the drawings, reference number 1 designates the excavator under-frame which is formed like a big cylindric vessel. The upper frame 2 of the excavator is rotatably movable relative to the under-frame 1 in known manner. In order to prevent the excavator from sinking deeply into soft ground, the bottom 3 of the under frame 1 is formed like a big support plate.

The wheels 4 of the excavator are pivotably mounted to brackets 5 which are displaceably fastened to the periphery of the under frame 1, so that gauge of track and distance of wheels can be changed, whereby the gauge of track can be made narrow enough so that the excavator can use the public road network, at the same time as the gauge of track can be made broad enough for good stability in the open terrain. By this arrangement crawlers can readily be mounted to the wheels 4 if desirable.

As shown in the drawings, the wheels 4 are carried on arms 10 which are pivoted at one end to the brackets 5 by pins 11, the other ends of said arms having arcuate slots 12 therein drawn on a radius from the pivot pins 11. A bolt 13 projects through each slot 12, and said bolts function to anchor the arms 10 in a fixed position relative to their associated brackets 5.

The cylindrical under frame 1 has upper and lower circumferential ribs 14 and 15, respectively, thereon, and each bracket 5 has a notch 16 therein that is engaged over the upper rib 14. The brackets 5 are secured to the upper rib 14 by screws 17, or other suitable releasable fastening means. Clamp members 18 are utilized to clamp the bottoms of the brackets 5 to the lower rib 15.

The manner in which the invention functions is believed obvious from the drawings. The screws or other fasteners 17 are the clamp members 18 are first released, and the brackets 5 are then moved about the periphery of the cylindrical under frame 1 until the desired width between the wheels 4 is obtained. The brackets 5 are then secured in place. Thereafter, the bolts 13 are loosened, and the arms 10 are adjusted to align the fore and aft wheels 4 on each side of the excavator, after which the bolts 13 are again tightened. The excavator is then ready to be moved.

Figure 2:
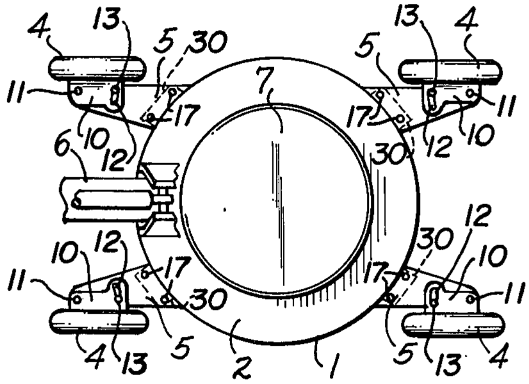
FIG. 2 is a top view of the excavator.

The boom 6 as well as cabin 7 are mounted on the upper frame 2 of the excavator. The boom 6 is provided in known manner with a bucket 8. As shown in the drawings, the upper and lower ribs 14 and 15 are both continuous and circular, and lie in parallel horizontal planes. This makes it possible to slide the brackets 5 therealong to any desired position. Turning to the screws 17, as has been noted such can be any suitable releasable fastening means. In the preferred embodiment, however, the screws 17 are located outwardly of the upper rib 14, as indicated in FIG. 2, and engage clamping plates 30 carried within the brackets 5. (FIG. 2) When the screws 17 are tightened, the upper rib 14 is clamped between the plates 30 and the projecting upper wall 32 defining the notch 16.

What is claimed is:

1. An excavator, comprising:

an under frame, said under frame being generally cylindrical and including vertical wall means;

upper and lower circular, continuous rib means formed on the exterior of said vertical wall means of said cylindrical under frame, said upper and lower rib means lying in parallel, generally horizontal planes;

an upper frame rotatably mounted on said under frame, and supporting a boom and bucket assembly, and an operator cabin;

a pair of fore brackets and a pair of aft brackets, all of said brackets being engageable with both of said upper and said lower circular, continuous rib means and being slidable therealong to any desired selected position;

clamp means for releasably securing said brackets to said upper and said lower continuous rib means in selected locations therealong about the periphery of said vertical wall means of said cylindrical under frame;

a horizontally elongated arm pivoted at one end thereof each of said brackets, for pivotal movement in a horizontal plane; and means for releasably securing said elongated pivoted arms to their associated brackets in a selected pivoted relationship; and wheel means carried on the free, other end of each of said arms, said brackets being movable about the periphery of said cylindrical under frame to vary the width between said wheel means at the fore end and the aft end of said excavator, and said arms being adjustable relative to their associated brackets to properly align said wheel means.

2. An excavator as recited in claim 1, wherein said means for releasably securing said arms to their associated brackets comprises:

bolt means carried by each bracket, and arranged to project through an arcuate slot formed in the pivoted arm associated with said bracket, said arcuate slot being drawn on a radius eminating from the pivotal axis of said arm.

* * * * *